United States Patent [19]

McBride

[11] Patent Number: 5,859,093
[45] Date of Patent: Jan. 12, 1999

[54] SHOE LASTING ADHESIVE

[75] Inventor: Edward McBride, Wilmington, Del.

[73] Assignee: E. I. du Pont de Nemours and Company, Wilmington, Del.

[21] Appl. No.: 987,630

[22] Filed: Dec. 9, 1997

Related U.S. Application Data

[60] Provisional application No. 60/032,834, Dec. 13, 1996.
[51] Int. Cl.$^6$ .......................... C09J 123/08; C08L 91/06; C08K 5/01
[52] U.S. Cl. .......................... 523/167; 524/275; 524/487
[58] Field of Search ............................ 523/167; 524/275, 524/487, 489

[56] References Cited

U.S. PATENT DOCUMENTS

| | | | |
|---|---|---|---|
| 4,631,308 | 12/1986 | Graham et al. | 524/487 |
| 4,996,259 | 2/1991 | Koehler et al. | 524/275 |
| 5,500,472 | 3/1996 | Liedermoog et al. | 524/275 |

*Primary Examiner*—Peter Szekely
*Attorney, Agent, or Firm*—Craig H. Evans

[57] ABSTRACT

A hot-melt adhesive for use as a shoe last adhesive, particularly one in a form for use in a direct through feed adhesive dispensing system, made from a melt-blend of a copolymer of ethylene and carboxylic acid, a synthetic wax such as a Fischer-Tropsch wax, and an ethylene/unsaturated carboxylic acid wax having a melt index of at least about 5000 dg/min.

20 Claims, No Drawings ature. Polyamide rods have typically been used with direct through-feed systems for shoe last adhesives. The polyamides, however, tend to become brittle at low temperatures and have poor thermal stability.

SHOE LASTING ADHESIVE

This application claims the benefit of U.S. Provisional Application No. 60/032,834, filed Dec. 13, 1996.

BACKGROUND OF INVENTION

1. Field of Invention

This invention relates to a hot-melt adhesive, particularly an adhesive made from a copolymer of ethylene and carboxylic acid blended with a synthetic wax such as a Fischer-Tropsch wax and a high-melt index ethylene/unsaturated carboxylic acid wax having a melt index of at least about 5000 dg/min. The adhesive is particularly useful in rod or strip form in direct, through-feed adhesive dispensers used for application of shoe last adhesive.

2. Background Discussion and Related Art

Direct, through-feed adhesive melting and applying systems have long been used in the manufacturing of shoes. These are systems in which solid adhesive material is supplied to a dispensing apparatus at the rate at which heat softened adhesive is applied to a workpiece and in which there is no reservoir or other substantial body of adhesive held in molten condition out of the direct line of flow from the entry to the exit of the dispensing apparatus. The adhesive for these systems are in the form of slender, flexible rods or stands. These rods must be sufficiently stiff to be fed longitudinally but adequately flexible to be coiled and uncoiled for use without cracking and without blocking or adhering to adjacent rod when coiled. To work effectively, the adhesive rod should have a combination of properties, particularly freedom from tack, dimensional stability, shape retention and resistance to degradation during storage so that the rod doesn't change from the shape required for cooperation with the softening and dispensing passageway.

U.S. Pat. Nos. 3,283,890 and 3,317,368, which are incorporated herein by reference, teach such systems. U.S. Pat. Nos. 2,762,716 and 2,765,768 are cited in U.S. Pat. No. 3,283,890 as showing direct through-feed systems. U.S. Pat. No. 3,283,890 teaches rods of substantially uniform cross-section made by blending various ingredients. U.S. Pat. No. 3,317,368 teaches a composite thermoplastic adhesive rod having a longitudinally extending central portion and an external layer surrounding the central portion.

Polyamide rods have typically been used with direct through-feed systems for shoe last adhesives. The polyamides, however, tend to become brittle at low temperatures and have poor thermal stability.

It has been found that the polyamide rods for use on existing through-feed systems as shoe-last adhesives can be replaced with hot melt adhesives based on copolymers of ethylene and an α, β-ethylenically unsaturated carboxylic acid if a combination of low viscosity, high stiffness, good elongation, fast set speed on a shoe line, and specific adhesion to a broad range of substrates (e.g., oily leather, synthetic leather, shoe board, and polyvinyl chloride) can be obtained. The ethylene copolymers alone do not meet these requirements. It has further been found that through proper selection of ethylene copolymers and by blending them with certain waxes, a shoe last adhesive that will run effectively on existing through-feed systems in place of higher cost polyamides results.

SUMMARY OF INVENTION

According to the current invention, there is provided a hot melt adhesive, particularly one in the form of a rod, strip, strand, or the like for use in a direct through feed adhesive dispensing system and, more particularly, for shoe last adhesive applications. It consists essentially of (a) a copolymer of ethylene with an unsaturated carboxylic acid selected from the group consisting of acrylic acid (E/AA copolymer) and methacrylic acid (E/MAA copolymer) having a melt index (MI) as if measured by ASTM 1238 Condition E of at least 100 deci-grams per minute (dg/min.) to about 2000 dg/min. but preferably about 500 dg/min., (b) a synthetic wax selected from the group consisting of Fischer-Tropsch wax, polyethylene wax, and their oxidized counterparts, and (c) a high melt index E/AA or E/MAA copolymer having a melt index as if measured by ASTM 1238 Condition E of at least about 5,000 dg/min. but preferably at least 10,000 dg/min. The high melt index E/AA or E/MAA copolymer of this invention have viscosities of less than about 5000 centipoise (cp.), preferably of about 600 cp. at 140° C.

DETAILED DESCRIPTION OF INVENTION

For purpose of the present disclosure and claims, the expression "consisting essentially of" means that the recited components are essential, while smaller amounts of other components may be present to the extent that they do not detract from the operability of the present invention.

The adhesive of the present invention consists essentially of a melt blend of ethylene acid copolymer, synthetic wax and high MI copolymer as more fully described below. Preferably, the adhesive consists essentially of about 50 to about 95, more preferably about 70 to about 90, weight percent (wt. %) ethylene acid copolymer, of about 5 to about 30, more preferably about 8 to about 20, wt. % synthetic wax, and of about 5 to about 30, more preferably about 8 to about 20, wt. % high MI copolymer. Weight percentages are based on the total weight of ethylene acid copolymer, synthetic wax and high MI copolymer. Minor amounts of other components such as fillers, antioxidants, colorants, and stabilizing additives that do not substantially adversely affect the compatibility of the system or the desired combination of low viscosity, high stiffness (tensile and flex modulus), good elongation, fast set speed on a shoe line, and specific adhesion to a broad range of substrates, particularly oily leather, synthetic leather, shoe board, and polyvinyl chloride. While low levels of components such as tacklfiers, paraffin wax and microcrystalline wax may be added to adjust some properties, they preferably are excluded particularly when making a solid, flexible thermoplastic adhesive for direct, through-feed adhesive dispensing systems.

The adhesive in the form of slender, flexible rods or stands for use in direct, through-feed adhesive dispensers used for application of shoe last adhesive can be made by various procedures such as by extrusion, drawing or the like., Devices useful for making the continuous rods are well known in the art. Using extrusion as an example, the following procedures can be used to make the continuous rods of this invention.

First of all, the hot-melt adhesive may be made by tumble blending the dry ingredients and then fed to a melt blending extruder. For example, some of the blends have been made on a 1½ inch Davis Standard extruder (single screw extruder with a mixing screw) and some on a Werner and Pflieder 30 mm extruder (twin screw). Both types of extruders were found to work well. In either case, the extruded strands exit the extruder through a strand water bath and are then pelletized.

Then, the pelletized blends can then be fed to an extruder equipped with a die hole sized to produce the desired strand diameter. For example, pellets of the blends of this invention were fed to a 1½ inch Davis Standard extruder equipped with an 0.225 inch single hole die. In order to process these comparatively low-viscosity blends well in the extruder, it was found important to set the temperature as low as possible, that is close to the melting point of the ingredients. Typical temperatures were about 90° to about 100° C. If the temperature were too high, say about 150° to 200° C., the strand exiting the die would be too "runny" and would not have enough melt strength to make a good strand.

The strand exits the die into a strand water bath and then through a two-belt take-off roll. The extruder speed (revolutions per minute (RPM)) and the take off roll speed can be varied to get the required rod thickness. By decreasing the take off speed, the rod thickness increases. By increasing the take off speed, the thickness decreases.

The diameter of the flexible rod can be varied based on intended use and the nature of the direct, through-feed dispensing and application machine, but preferably has a diameter of about 3.5 to about 4.5 millimeters. The rod can be coiled onto a spools for storage and use, and is stable (does not crack or "set" into a solid block on storage for over six months).

It has also been found that the adhesives of the present invention can be formed into solid, flexible thermoplastic strands in a single extrusion step, that is, the dry ingredients can be tumble blended and then fed directly to an extruder equipped with a properly sized die hole (e.g. a Davis Standard extruder with a 0.225 inch single hole die as used in the examples) without first making a melt blend and pellets. As the strand exits the die, it passes through a strand water bath and then onto the take off rolls. A single extrusion step would be preferred for commercial production because it has the lowest cost of manufacturing.

Since most extruders are designed to handle high viscosity materials, special attention should to be given to processing the adhesives of the present invention since they have very low viscosities. There are several ways to make the material process easier ensuring good mixing. The extruder may be run with a constant temperature profile that is just above the melting point of the polymers and waxes, that is, about 100° C. Another approach is to use a temperature profile that is above the melting point of the polymers and wasaxes at the feed end of the extruder and is less than the melting point but above the freezing point of the polymers and waxes at the back end of the extruder and the die, that is, about 80° to 100° C. Still another approach is to install screenpacks, say about 4 having 100 mesh screens between the tip of the screw and the die to increase back pressure to improve mixing.

The materials can also be blended in typical hot-melt equipment such as heated batch mixers equipped with agitators. The material can be pelletized as it exits the hot melt mixer and the pellets can be fed to an extruder to make the rod. Alternatively, the hot melt from the hot melt mixer can be fed directly to an extruder instead of first pelletizing, this being a preferred approach since the adhesive would have less heat history.

Ethylene Acid Copolymer

The ethylene acid copolymer employed in the present invention is a copolymer of ethylene with at least one $C_3-C_7$ α, β-unsaturated carboxylic acid, preferably one selected from the group consisting of acrylic acid (E/AA copolymer) and methacrylic acid (E/MAA copolymer). The copolymer may contain from about 5 to about 30, preferably from about 7 to about 20, wt. % of the unsaturated carboxylic acid.

While dipolymers are preferred, small amounts of a third monomer such as, for example, $C_1-C_{10}$ alkyl esters of $C_3-C_7$ α, β-unsaturated carboxylic acid, vinyl esters, vinyl ethers, acrylonytrile, methacrylonytrile, carbon monoxide, and sulfur dioxide may be incorporated.

Ethylene acid copolymer useful in this invention has a melt index as measured by ASTM 1238 Condition E, which requires a temperature of 190° C. and a 2,160 gram weight, of at least 100 dg/min. to about 2000 dg/min. but preferably about 500 dg/min. Typically, the MI's of these copolymers are measured according to ASTM 1238 Condition A (125° C. and 350 gram weight) and converted to MI's as if measured according to Condition E.

Methods for preparing these ethylene acid copolymers are well known in the art.

Synthetic Wax

The synthetic wax employed in the present invention is a slightly incompatible synthetic wax selected from the group consisting of Fischer-Tropsch wax, polyethylene wax, and their oxidized counterparts. U.S. Pat. Nos. 2,504,400; 2,683,141 and 2,712,534, incorporated herein by reference, teach useful synthetic waxes. Examples of various synthetic waxes are POLYWAX®655 (a polyethylene wax from Barreco); ALLIED®629 (an oxidized polyethylene wax from Allied Chemical); PARAFLINT®H-1 (a Fischer-Tropsch wax (polymethylene) from Moore & Munger); and PARAFLINT®H105 (a Fischer-Tropsch wax from Moore & Munger).

High MI Copolymer

The High MI Copolymers, also known in the industry as "low molecular weight polymers", employed the present invention comprise ethylene α, β-unsaturated carboxylic acid, preferably ethylene acrylic acid (E/AA) or ethylene methacrylic (E/MAA), copolymer having a melt index as if measured by ASTM 1238 Condition E, which requires a temperature of 190° C. and a 2,160 gram weight, of at least about 5,000 dg/min. but preferably at least 10,000 dg/min. Since the MI of these High-MI Copolymers is so high, their viscosity is generally measured and converted to the MI as if measured according to ASTM 1238 Condition E. The high-MI Copolymers of this invention have viscosities, as measured with a Brookfield viscometer, of less than about 5000 cp. at 140° C., preferably about 600 cp. at 140° C.

They normally will be dipolymers, although minor amounts of a third monomer, such as, for example, $C_1-C_{10}$ alkyl esters of $C_3-C_7$ α, β-unsaturated carboxylic acid, vinyl esters, vinyl ethers, acrylonytrile, methacrylonytrile, carbon monoxide, and sulfur dioxide.

High MI E/AA copolymers are available from Allied Signal Corporation under the trademark A-C® Copolymers. They can be made according the general disclosure of U.S. Pat. No. 3,264,272 to Rees. Commercial ethylene and acrylic acid or methacrylic acid are fed in a continuous manner to a stirred pressure vessel with a free radical initiator (t-butyl peroxyacetate) fed by a separate line. The flow of monomers is adjusted to give constant mole ratios, and the feed rate is the same as the rate of discharge of polymer and unpolymerized monomers from the reactor. Small amounts of telogen (acetone or methanol) are introduced into the reactor with the feed monomers to control molecular weight.

Other Components

Other ingredients such as fillers, anti-oxidants and slip additives, may be added provided that they are added at low levels (preferably less than about 10, more preferably less than about 7, parts per hundred based on total weight of the ethylene acid copolymer, synthetic wax and high MI copolymer blend) so as to not adversely affect the balance of properties of the adhesive.

FILLERS such as Calcium carbonate or titanium dioxide can be added to make the adhesive opaque or to slightly increase the stiffness. If high levels of filler are added then the viscosity will increase too much.

ANTI-OXDANTS, which are well known in the hot melt adhesive industry, can be used to increase the thermal stability of the adhesive. Typical levels are less than 1 wt. % based on weight of primary components of the adhesive.

SLIP ADDITIVES can be used to help the adhesive process better on existing equipment. The drawback with using slip additives is that it hurts specific adhesion to most substrates.

Other ingredients, such as paraffin wax, microcrystalline wax, and tackifiers, preferably are avoided but may be included in certain cases at low levels (preferably less than about 10, more preferably less than about 7, parts per hundred based on total weight of the ethylene acid copolymer, synthetic wax and high MI copolymer blend) to get desired properties.

PARAFFIN WAX or MICROCRYSTALLINE WAX can be added to the adhesive to lower the viscosity and cost of the adhesive. The drawback with adding them is that they will increase the open time (lower line speed). They will also hurt the specific adhesion to most substrates. The microcrystalline wax will also lower the modulus.

TACKIFIERS that can be used include rosin esters, rosin acids and some hydrocarbon resins. The advantage of using the tackifiers is that they improve specific adhesion and lower the viscosity of the adhesive. The disadvantage of adding the tackifier is that they make the adhesive softer (more flexible) which makes it difficult to feed through the existing application equipment. The tackifier also causes the open time to increase (lower line speed).

EXAMPLES

Preparation of Blends and Testing

The first step was to prepare 100 gram samples. A one (1) pint paint can (about 500 ml) was placed in a hot block that was heated to 350° F. (177° C.). Ingredients in the form of dry pellets, prills, flakes or powder. The primary ingredients (NUCREL®, PARAFLINT®, and A-C®) were tumble blended in the parts per hundred parts based on weight of the total of the primary ingredients indicated in the Tables. The other ingredients (IRGANOX® and the TIPURE®) were blended in the parts per hundred parts based on weight of the total primary ingredients as indicated in the Tables. After these ingredients melted, they were stirred with an air-driven, three-blade agitator at a tip speed of approximately 50 to 100 rpm.

The resulting melt-blends were poured onto release paper and allowed to solidify and checked to see if brittle or flexible. Flexible samples were tested to determine viscosity in a Brookfield Thermocel (model DV-II) at 350° F. and 400° F. (177° C. and 204° C.). The shear rate was between 1 and 50 reciprocal seconds.

The resulting melt-blends were also compression molded. About 15 grams of the blend was placed into a mold that was about ⅛ inch thick and four inches by four inches. The mold was heated to about 350° F. (177° C.) and held there for about five minutes and then cooled to room temperature. The samples were then tested for tensile strength and percent elongation by ASTM D 1708 and were also tested for flexural modulus by ASTM D790.

Preparation of Rods

The dry ingredients totaling between 10 and 20 pounds (about 5 to 10 kilograms) were tumbled blended and then fed to an extruder. Some of the blends were made on a 1½ inch Davis Standard extruder (single screw extruder with a mixing screw) and some on a Werner and Pflieder 30 mm extruder (twin screw). Both types of extruders were found to work well. In either case, the extruded strand exited the extruder through a strand water bath and was then pelletized.

The pelletized blends were fed to a 1½ inch Davis Standard extruder (single screw with mixing screw) that was equipped with an 0.225 inch single hole die. In order to process these comparatively low-viscosity blends well in the extruder, it was found important to set the temperature as low as possible, that is close to the melting point of the ingredients. Typical temperatures were about 90° to about 100° C. If the temperature were too high, say about 150° to 200° C., the strand exiting the die would be too "runny" and would not have enough melt strength to make a good strand. The extruder was equipped with 4 screenpacks of 100 mesh screens between the tip of the screw and the die.

The strand exited the die into a strand water bath and then through a two-belt take-off roll. The extruder speed (revolutions per minute (RPM)) and the take off roll speed were varied to get the required rod thickness. By decreasing the take off speed, the rod thickness would increase. By increasing the take off speed, the thickness would decrease. The desired strand diameter was either 4.05 mm or 4.25 mm. Once the extruder was lined out we were able to consistently meet the diameter requirements.

The rod formed well without crackling and had reasonably uniform diameter (about 4.2 to about 4.4 millimeters). A hundred feet or more rod was extruded and coiled onto a spools. The coiled stock had good stability, not cracking or sticking to itself after more than six months of storage. The coiled rod was tested in direct, through-feed dispensers and found to perform satisfactorily.

TABLE 1

|  | 1 | 2 | 3 | 4 | 5 | 6 | 7 |
|---|---|---|---|---|---|---|---|
| NUCREL ® 699[1] | 40 | 40 | 40 | 38 |  |  |  |
| NUCREL ® 599[2] | 38 | 40 | 38 | 40 | 80 | 80 | 80 |
| PARAFLINT ® H-1[3] | 16 | 10 | 6 | 14 | 10 | 10 | 10 |
| A-C ® 5120[4] | 6 | 10 | 16 | 8 | 10 | 10 |  |
| A-C ® 540[5] |  |  |  |  |  |  | 10 |
| IRGANOX ® 1010[6] | 0.2 | 0.2 | 0.2 | 0.2 | 0.2 |  |  |
| TIPURE ® 960[7] |  |  |  |  |  | 1.0 |  |
| Viscosity, cp |  |  |  |  |  |  |  |
| @ 400° F. | 8800 | 10800 | 11300 | 9100 | 5400 | 5850 | 5300 |
| @ 350° F. | 19300 | 24800 | 26000 | 19500 | 11800 | 12000 | 10900 |
| Tensile, psi | 1520 | 1570 | 1460 | 1490 | 1440 | 1320 | 1340 |

TABLE 1-continued

|  | 1 | 2 | 3 | 4 | 5 | 6 | 7 |
|---|---|---|---|---|---|---|---|
| Elongation, % | 150 | 260 | 290 | 180 | 160 | 140 | 140 |
| Flex Modulus, psi | 39000 | 27000 | 19000 | 36000 | 26000 | 29000 | 32000 |

Notes for Table 1:
[1] 11 wt % acid, 100 MI ethylene methacrylic acid copolymer available from E. I. du Pont de Nemours and Company
[2] 10 wt % acid, 500 MI ethylene methacrylic acid copolymer available from E. I. du Pont de Nemours and Company
[3] Fischer-Tropsch wax (polymethylene) available from Moore & Munger with viscosity of 10 cp at 120° C., MW of 850, and congealing point of 98° C.
[4] Ethylene acrylic acid copolymer available from Allied Signal Corporation having an acid number of 120 (mg KOH(g) equating to 15 wt. % acid, and a viscosity of 650 cp at 140° C. in Brookfield viscometer.
[5] Ethylene acrylic acid copolymer available from Allied Signal Corporation having an acid number of 40 (mg KOH(g) equating to 5 wt. % acid, and a viscosity of 575 cp at 140° C. in Brookfield viscometer.
[6] Tetrakis (methylcne(3,5,-di-tert-butyl-4-hydroxyhydrocinnamate)) antioxidant available from Ciba Geigy Chemical Corporation.
[7] Titanium dioxide pigment available from E. I. du Pont de Nemours and Company

I claim:

1. A hot melt adhesive consisting essentially of a melt blend of the following components:
   (a) a copolymer of ethylene with an unsaturated carboxylic acid selected from the group consisting of acrylic acid and methacrylic acid having a melt index of about 100 dg/min. to about 2000 dg/min. determined according to ASTM 1238 Condition E;
   (b) a synthetic wax selected from the group consisting of Fischer-Tropsch wax, polyethylene wax, and their oxidized counterparts; and
   (c) a high-melt-index copolymer of ethylene with an unsaturated carboxylic acid selected from the group consisting of acrylic acid and methacrylic acid, the high-melt-index copolymer having a melt index of at least about 5,000 dg/min. determined according to ASTM 1238 Condition E.

2. The hot melt adhesive of claim 1 wherein the copolymer of ethylene with an unsaturated carboxylic acid in component (a) has a melt index of about 500 dg/min.

3. The hot melt adhesive of claim 2 wherein the high-melt-index copolymer of component (c) has a melt index of at least about 10,000 dg/min.

4. A solid flexible thermoplastic adhesive in the form of a rod, strip, strand, for use in a direct through feed adhesive dispensing system consisting essentially of a melt blend of the following components:
   (a) a copolymer of ethylene with an unsaturated carboxylic acid selected from the group consisting of acrylic acid and methacrylic acid having a melt index of about 100 dg/min. to about 2000 dg/min. determined according to ASTM 1238 Condition E;
   (b) a synthetic wax selected from the group consisting of Fischer-Tropsch wax, polyethylene wax, and their oxidized counterparts; and
   (c) a high-melt-index copolymer of ethylene with an unsaturated carboxylic acid selected from the group consisting of acrylic acid and methacrylic acid, the high-melt-index copolymer having a melt index of at least about 5,000 dg/min. determined according to ASTM 1238 Condition E.

5. The solid flexible thermoplastic adhesive of claim 4 wherein the copolymer of ethylene with an unsaturated carboxylic acid in component (a) has a melt index of about 500 dg/min.

6. The solid flexible thermoplastic adhesive of claim 4 wherein the high-melt-index copolymer of component (c) has a melt index of at least about 10,000 dg/min.

7. The hot melt adhesive of claim 1 wherein, based on the total weight of (a), (b) and (c), the adhesive consists essentially of about 50 to about 95 wt. % component (a), about 5 to about 30 wt. % component (b), and about 5 to about 30 wt. % component (c).

8. The hot melt adhesive of claim 7 wherein, based on the total weight of (a), (b) and (c), the adhesive consists essentially of about 70 to about 90 wt. % component (a), about 8 to about 20 wt. % component (b), and about 8 to about 20 wt. % component (c).

9. The hot melt adhesive of claim 2 wherein, based on the total weight of (a), (b) and (c), the adhesive consists essentially of about 50 to about 95 wt. % component (a), about 5 to about 30 wt. % component (b), and about 5 to about 30 wt. % component (c).

10. The hot melt adhesive of claim 9 wherein, based on the total weight of (a), (b) and (c), the adhesive consists essentially of about 70 to about 90 wt. % component (a), about 8 to about 20 wt. % component (b), and about 8 to about 20 wt. % component (c).

11. The hot melt adhesive of claim 3 wherein, based on the total weight of (a), (b) and (c), the adhesive consists essentially of about 50 to about 95 wt. % component (a), about 5 to about 30 wt. % component (b), and about 5 to about 30 wt. % component (c).

12. The hot melt adhesive of claim 11 wherein, based on the total weight of (a), (b) and (c), the adhesive consists essentially of about 70 to about 90 wt. % component (a), about 8 to about 20 wt. % component (b), and about 8 to about 20 wt. % component (c).

13. The solid flexible thermoplastic adhesive in the form of a rod, strip, strand, for use in a direct through feed adhesive dispensing system of claim 4 wherein, based on the total weight of (a), (b) and (c), the adhesive consists essentially of about 50 to about 95 wt. % component (a), about 5 to about 30 wt. % component (b), and about 5 to about 30 wt. % component (c).

14. The solid flexible thermoplastic adhesive of claim 13 wherein, based on the total weight of (a), (b) and (c), the adhesive consists essentially of about 70 to about 90 wt. % component (a), about 8 to about 20 wt. % component (b), and about 8 to about 20 wt. % component (c).

15. The solid flexible thermoplastic adhesive of claim 5 wherein, based on the total weight of (a), (b) and (c), the adhesive consists essentially of about 50 to about 95 wt. % component (a), about 5 to about 30 wt. % component (b), and about 5 to about 30 wt. % component (c).

16. The solid flexible thermoplastic adhesive of claim 15 wherein, based on the total weight of (a), (b) and (c), the adhesive consists essentially of about 70 to about 90 wt. % component (a), about 8 to about 20 wt. % component (b), and about 8 to about 20 wt. % component (c).

17. The solid flexible thermoplastic adhesive of claim 6 wherein, based on the total weight of (a), (b) and (c), the adhesive consists essentially of about 50 to about 95 wt. % component (a), about 5 to about 30 wt. % component (b), and about 5 to about 30 wt. % component (c).

18. The solid flexible thermoplastic adhesive of claim 17 wherein, based on the total weight of (a), (b) and (c), the adhesive consists essentially of about 70 to about 90 wt. % component (a), about 8 to about 20 wt. % component (b), and about 8 to about 20 wt. % component (c).

19. A shoe-last adhesive consisting essentially of the flexible adhesive of claim 4.

20. A shoe-last adhesive consisting essentially of the flexible adhesive of claim 14.

* * * * *